UNITED STATES PATENT OFFICE.

WILLIAM KIEL, OF BUTLER, NEW JERSEY, ASSIGNOR TO KIEL, BUTLER & TURNBULL, OF NEW YORK, N. Y.

PROCESS OF MANUFACTURING VULCANIZED PLASTIC COMPOUNDS.

SPECIFICATION forming part of Letters Patent No. 412,265, dated October 8, 1889.

Application filed January 19, 1889. Serial No. 296,916. (No specimens.)

*To all whom it may concern:*

Be it known that I, WILLIAM KIEL, a citizen of the United States, residing at Butler, in the county of Morris, in the State of New Jersey, have invented an improved process of manufacturing vulcanized plastic compounds into which wood enters as an ingredient in large quantities, (for which compounds I have filed simultaneously herewith application for Letters Patent,) of which the following is a specification.

My new process enables me to produce very superior vulcanized plastic compounds which, if vulcanized so as to produce a hard substance, can be used to great advantage in the place of hard rubber, whalebone, ivory, and even wood, and which, if vulcanized so as to produce a soft substance, can be used to take the place of soft rubber and its compounds, and which possesses in each case very superior qualities.

My invention consists in boiling or soaking wood in oil, then combining the product thus obtained with sulphur and crude rubber, to which I preferably add a small quantity of beeswax. I use crude rubber which has been washed and dried.

In order to apply my invention, I saw or otherwise convert the wood into some convenient form. I then boil or soak the particles of wood in oil, and then mix the product thus obtained, the sulphur, and the crude rubber and beeswax together, and then pass the whole through heated rollers. The compound thus prepared is ready for vulcanization.

The proportions between the ingredients above named vary according to the vulcanized plastic compound which it is desired to obtain. The beeswax tends to toughen the vulcanized plastic compound.

The time and the pressure applied in the process of vulcanizing hard rubber will, if applied here, produce a hard substance. In like manner the time of vulcanization and the pressure applied during the process of manufacturing soft rubber will, if applied here, produce a soft substance; but I do not confine myself to the limits within which these respective processes vary.

I do not claim the vulcanized plastic compounds which are the product of the herein-described process, as I have filed simultaneously herewith an application for Letters Patent for these compounds; and I do not limit myself to any particular proportions of the ingredients, as I may vary them as occasion may require; but What I do claim, and desire to secure by Letters Patent, is—

1. The herein-described process of manufacturing vulcanized plastic compounds of which wood is a constituent part by boiling or soaking wood in oil and subsequently combining by vulcanization the product thus obtained with sulphur and crude rubber, substantially as described.

2. The herein-described process of manufacturing vulcanized plastic compounds of which wood is a constituent part by boiling or soaking wood in oil and subsequently combining by vulcanization the product thus obtained with sulphur, beeswax, and crude rubber, substantially as described.

WILLIAM KIEL.

Witnesses:
 THOMAS HUNT,
 GHERARDI DAVIS,
 SHERMAN EVARTS.